(12) United States Patent
Gerald, II et al.

(10) Patent No.: US 7,501,483 B2
(45) Date of Patent: *Mar. 10, 2009

(54) MOLECULE NANOWEAVER

(75) Inventors: Rex E. Gerald, II, Brookfield, IL (US);
Robert J. Klingler, Glenview, IL (US);
Jerome W. Rathke, Homer Glen, IL (US); Rocio Diaz, Chicago, IL (US);
Lela Vukovic, Westchester, IL (US)

(73) Assignee: The University of Chicago, Chicago, IL (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/484,349

(22) Filed: Jul. 11, 2006

(65) Prior Publication Data

US 2007/0123695 A1 May 31, 2007

Related U.S. Application Data

(60) Provisional application No. 60/718,362, filed on Sep. 19, 2005.

(51) Int. Cl.
*C08G 64/00* (2006.01)
*C08F 63/02* (2006.01)

(52) U.S. Cl. .......................... 528/480; 422/68; 428/411; 428/412; 435/6; 435/7.1
(58) Field of Classification Search ..................... 435/6, 435/7.1; 422/68; 428/411, 412; 528/480
See application file for complete search history.

(56) References Cited

FOREIGN PATENT DOCUMENTS

WO    WO 9740385    * 10/1997

* cited by examiner

*Primary Examiner*—Terressa M Boykin
(74) *Attorney, Agent, or Firm*—Foley & Lardner LLP

(57) ABSTRACT

A method, apparatus, and system for constructing uniform macroscopic films with tailored geometric assemblies of molecules on the nanometer scale. The method, apparatus, and system include providing starting molecules of selected character, applying one or more force fields to the molecules to cause them to order and condense with NMR spectra and images being used to monitor progress in creating the desired geometrical assembly and functionality of molecules that comprise the films.

17 Claims, 3 Drawing Sheets

MOLECULE NANOWEAVER

CROSS-REFERENCE TO RELATED PATENT APPLICATIONS

This application claims the benefit under 35 USC 119(e) of U.S. Application No. 60/718,362, filed Sep. 19, 2005, incorporated herein by reference in its entirety.

GOVERNMENT INTEREST

The United States Government has certain rights in the invention pursuant to Contract No. W-31-109-ENG-38 between the U.S. Department of Energy and the University of Chicago operating Argonne National Laboratory.

The present invention is related generally to a method, apparatus, and system for fabrication of macro-size, micro-size, and nano-size articles using molecule subcomponents arranged on the nanometer scale. More particularly the invention is related to a method, apparatus, and system for manipulating molecules using mechanical, electric, magnetic, and intermolecular forces to manipulate the molecules into nanometer-size assemblies designed for preselected commercial applications.

BACKGROUND OF THE INVENTION

The nanotechnology field has shown great promise for providing new forms of materials for utilization in a wide variety of fields including for example biotechnology, chemical sensors, data storage, catalysis and materials with heretofore unachievable biological, medical, physical, electrical, magnetic and optical properties. Current methodologies for fabricating complex materials are highly limited and generally produce only minute patches or samples of novel material, such as predominantly amorphous films, powders and disordered solids, or cannot modify the initial molecular arrangement and makeup of the resulting nanoscale materials, but rather only produce a much smaller size of the same molecular structure available in larger sections or sizes by the present invention.

SUMMARY OF THE INVENTION

Using the methods of the invention, apparatus can be constructed to fabricate macro-, micro-, and even nano-scale objects, such as for example films, membranes and even sheets of dimensions greater than 1 cm$^2$. Given that a particular end property is sought, one can synthesize or assemble molecules of a selected variety and of different varieties to construct nanoscale size objects with the desired properties. The molecules are manipulated into useful patterns by forces that result from the interactions of molecules with other molecules (intermolecular interactions), and with external forces, such as mechanical force or external fields with properties associated with the molecules. Examples of interactions between forces and molecules include: centrifugal fields acting on molecular mass; magnetic fields acting on anisotropic molecular susceptibility, and electric fields acting on molecular dipole moments. In addition, intermolecular/intramolecular forces acting between/within molecules can be modified by application of centrifugal, electric and magnetic fields, individually or in concert. The patterns of molecules achievable by the manipulation of combinations of intermolecular interactions and externally applied fields can be made permanent by forming chemical bonds through chemical cross linking. For example, the surface of a chemically-tailored film can present a two-dimensional array of active sites for reaction with specific antigens. Such a film would refract light differently before and after antigen attachment, thus providing an antigen sensor. Films fabricated from nematogen molecules can function as optical gratings. Films made of biomolecules, such as a specific polymer, can serve as high-strength biomedical heart patches.

For example, a medical patch for the heart muscle may require a specific polymeric material to assist in a healing process. At the monolayer level the patch can be efficacious, but in thicker batch forms such a patch can be ineffective or even injurious. Thus, an innocuous patch material is used to support a monolayer of active polymer to present itself effectively to the heart muscle. This can be extended to cases where the active material is presented outwardly at an interface with particular molecular orientation. In such a case a target molecule is presented with a specific docking site from each molecule in the array that forms a surface of the film.

Basic science applications of the invention abound because this device and methodology provide the capability to manipulate a macroscopic quantity of discrete molecules with high definition. So, quantities of molecules can present themselves in identical orientations for study by various spectroscopies, for example. These concepts can be extended to include interactions of ordered 2- and 3-dimensional arrays of molecules with external stimuli, including radiation and matter.

Many other applications exist and will be discussed in detail hereinafter. The principal features of the method of the invention over existing devices and methods include, without limitation: (1) the ability to combine several external force fields (e.g, centrifugal, magnetic, and electric) for manipulating molecules into diverse pre-selected patterns to achieve a desired result, (2) the ability to combine external force fields and intermolecular/intramolecular force fields to manipulate and guide the patterning, weaving and assembly of molecules, and (3) the capability to monitor the process of molecular patterning, weaving and assembly in situ by methods of nuclear magnetic resonance (NMR) spectroscopy and magnetic resonance imaging (MRI) and other forms of spectroscopy as well as visual imaging.

Various aspects, features and advantages of the invention are described hereinafter, and these and other improvements will be described in more detail below, including the drawings as described hereinbelow.

DETAILED DESCRIPTION OF THE PREFERRED EMBODIMENT

Figure 1:
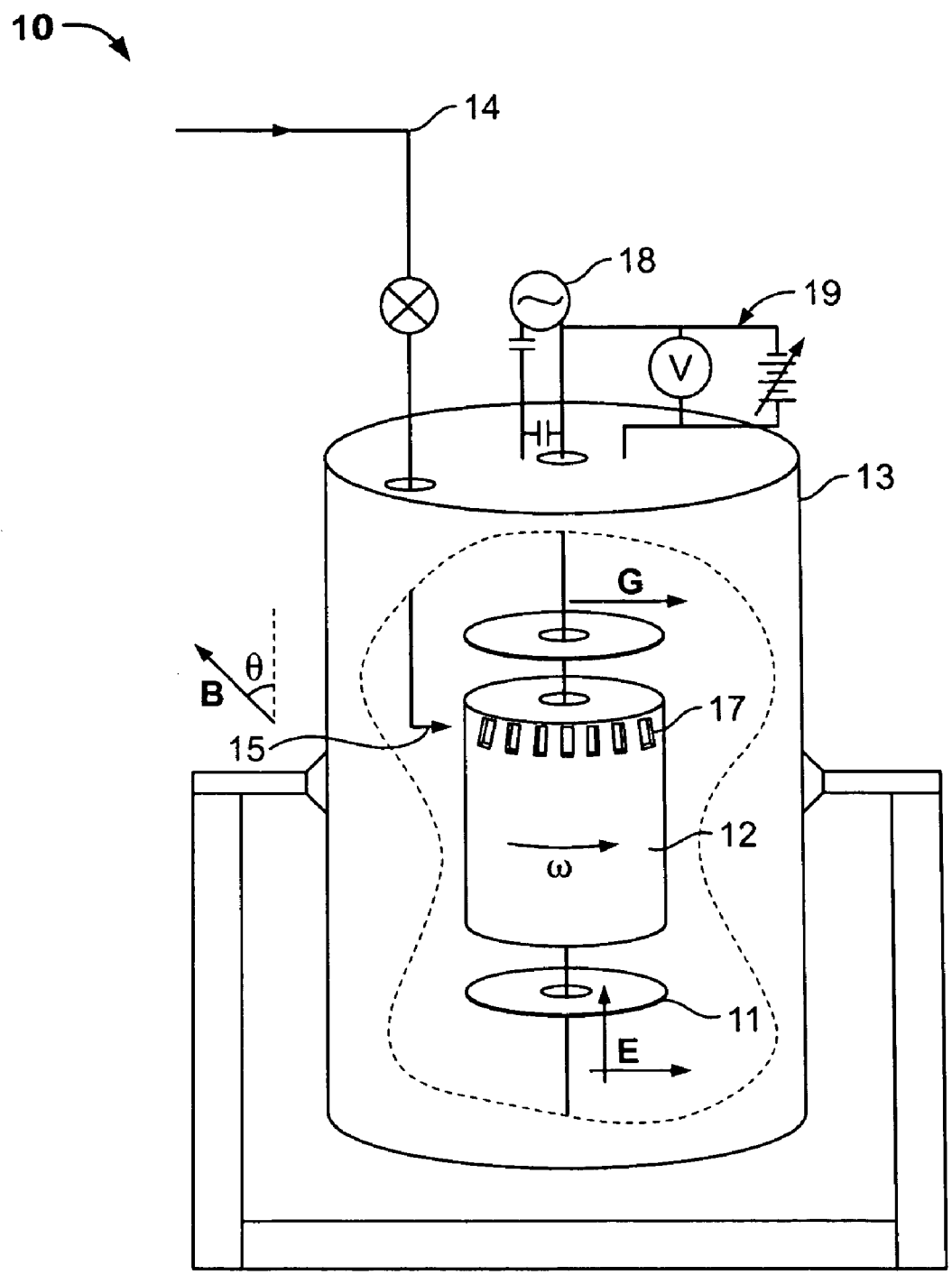
FIG. 1 illustrates a mechanical device for applying centrifugal, electric and magnetic force fields to construct macroscopic films or membranes with tailored assemblies of molecules.
Figure 2:
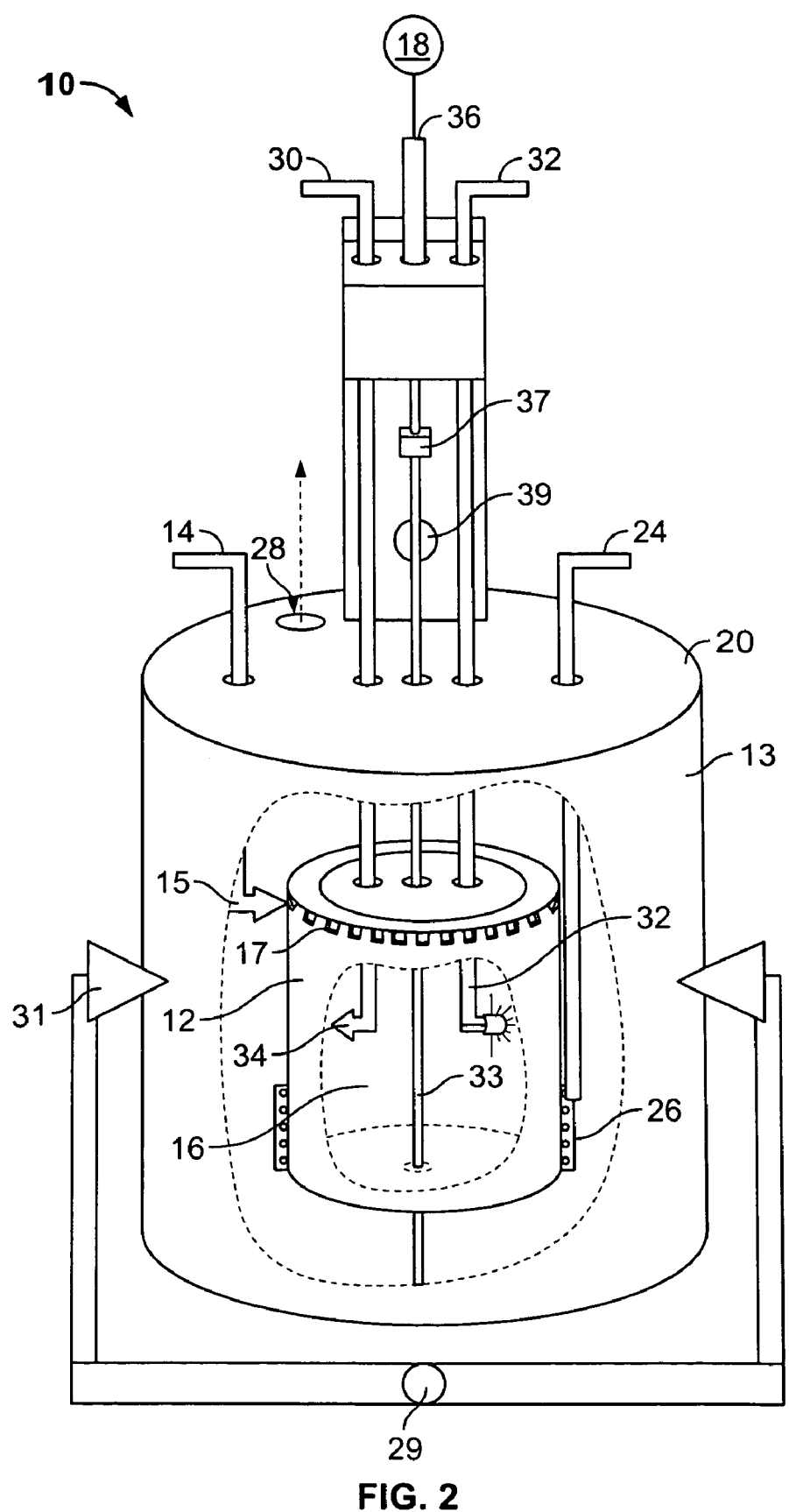
FIG. 2 illustrates another form of the mechanical device of FIG. 1.
Figure 3:
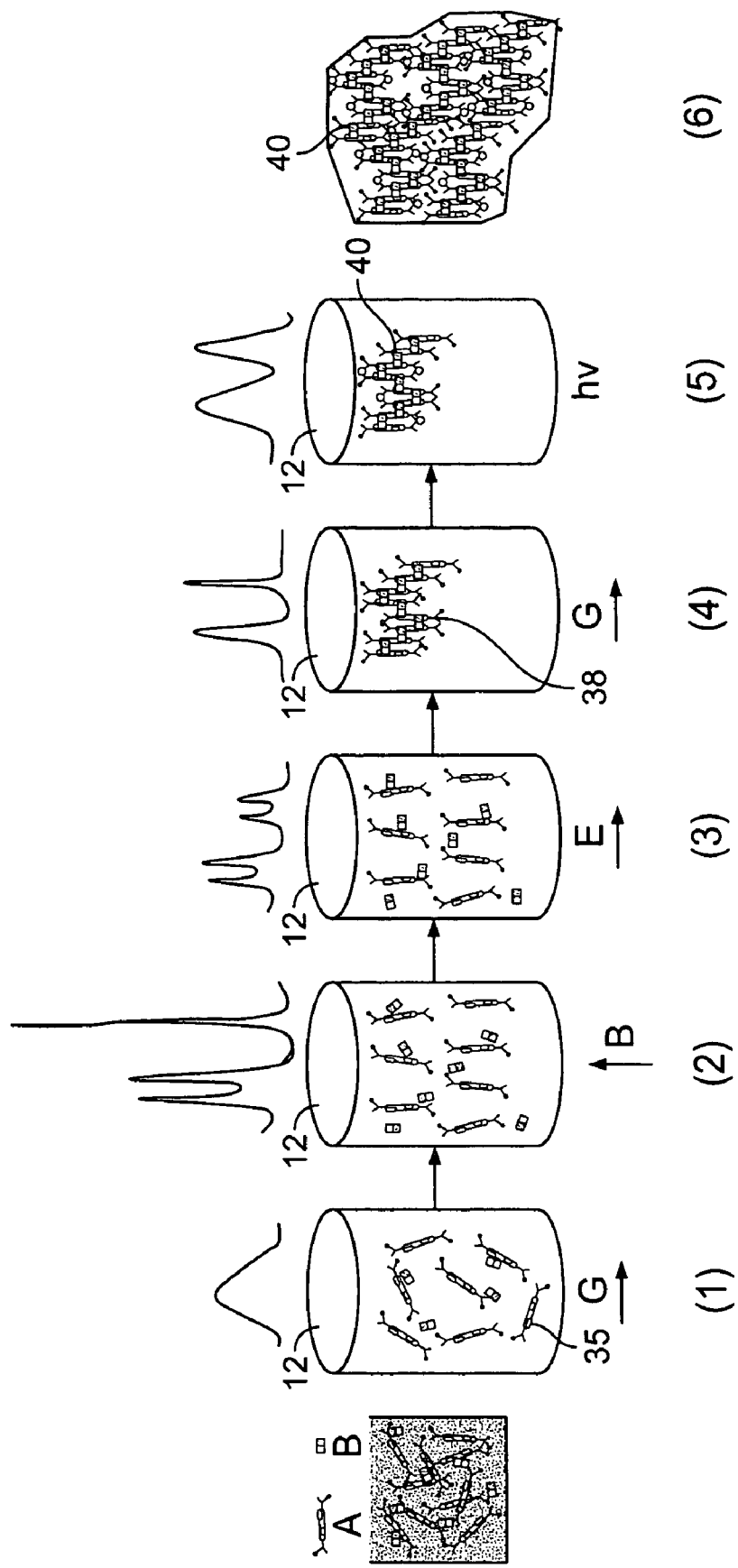
FIG. 3 illustrates a series of stages that constitute a generalized process for the formation of a film of nanoscale molecular assemblies.

A method and apparatus or system constructed in accordance with the invention is shown in FIGS. 1-3. The method is concerned with providing starting molecular material and then assembling these molecular subcomponents into films or membranes having a desired molecular structure on a nanoscale to macro size. For example, the properties of nano-woven films are subject to design and control by proper choice of starting molecular functional groups and molecular appendages (e.g., aldehyde, amide, ester, carboxylic acid; alkane chains, rings, chromophores) that are part of the constituent molecules. Further, the molecular size and shape of constituent molecules can be used to impart specific physical, chemical, electrical, magnetic, optical, mechanical, and medical properties and combinations thereof to the films or membranes or other objects being constructed. For example, one can form particular pore geometries with tailored sizes, shapes and distributions in film membranes. Such membranes are useful for filtration of molecules with specific sizes and shapes. In addition to pore size and shape, the pore walls can be decorated with functional groups that interact selectively with a specific site on a molecule, which has the size and shape to enter the pore. Among a variety of possibilities for film products—nanoporous polymer membranes, optical gratings, liquid crystal displays, catalysts, electrochemical sensor films, films of glass-like structure and transparency and non-porous films possessing surface activity to toxic gases (e.g., $SO_2$) and proteins (e.g., antigens)—the unifying feature is the underlying concept and methodology of nano-weaving. This new approach to nano-manufacturing (nano-fabrication) involves intermolecular/intramolecular interactions or reactions (e.g., self-assembly, cross-linking) of field-oriented monomers (constituent molecules) to form a scaffold of long-range molecular order, in selective geometries, such as cylindrical, for conveniently forming the resulting film product.

FIG. 1 illustrates one form of a device for assembling the tailored molecules into a film of macroscopic dimensions. An apparatus 10 includes a cylinder 12 disposed within a housing 13 which is rotated by a drive gas stream 14. A gas nozzle 15 directs the drive gas at an oblique angle onto outer-surface perforations 17 on upper portion of the cylinder 12, to cause rotation of the cylinder 12. Starting molecules are injected, such as by gas or liquid, onto an inner surface 16 (see FIG. 2) of the cylinder 12. The gas or liquid stream containing starting molecules passes through line 30 such that the molecules are applied preferably to the inner surface 16. The molecular constituents can be applied by a spray nozzle 34 positioned within the cylinder 12. Disk electrodes 11 located above and below the cylinder 12 can be used to subject the molecular constituents to a longitudinal electric field E. The molecular constituents can also be subjected to a radial electric field E by application of a voltage by power source 19 between central conductor 33 (see FIG. 2) and the metal housing 13. In situ observation of molecular deposition, manipulation, synthesis and cross-linking can be accomplished by a conventional spectroscopic system, such as NMR device 18 (see FIG. 1).

FIG. 2 illustrates another form of the apparatus of FIG. 1 with further detail of mechanical structure and operation. The cylinder 12 is rotated by drive gas from the drive gas stream housing 14 from gas nozzle 15 with the cylinder 12 supported by a gas bearing 26. The gas bearing 26 is supplied with bearing gas by bearing gas line 24. The bearing gas provides a low-friction gas bearing to support the cylinder 12 during rotation. The housing 20 further includes vent 28 for the excess gas, a heating/cooling gas input 29 and a pivot 31. The apparatus 10 also includes a molecular constituent input line 30; and in a preferred embodiment a monomer spray is introduced into the interior of the cylinder 12 and sprayed onto the inner surface 16. A variety of monitoring devices can be used to track progress of the molecular tailoring operation such as the above-referenced NMR device 18. Spectroscopic data (e.g., NMR, EPR, etc.) for tracking progress of the molecular tailoring operation is obtained via an electrical conduit or channel (hereinafter "channel") 36. Channel 36 also serves as a conductor for application of a radial electric field between the channel 36 and the metal cavity, or the housing 13. Thus, channel 36 can be electrified with AC or DC voltage to generate electric fields in the films 35, 38, and 40 (see FIG. 3). A cubic structure that interrupts the path of the channel 36 represents a ceramic capacitor 37. The capacitor 37 is part of a tuning circuit for the NMR functionality of the device 10, and can be referred to as a coupling capacitor or a matching capacitor. The NMR device 18 connects via electrical conduit 36 to a radiofrequency tunable resonant circuit composed of the capacitor 37, a variable capacitor 39, central conductor 33, and the metal housing 13.

In FIG. 2, a fiber optic cable 32 is disposed within the cylinder 12 to visually observe assembly of the molecules. The fiber optic cable 32 has a dual use; it also can be employed to irradiate with UV/VIS/IR light a fluid film on the inner surface 16 to cause chemical cross-linking reactions that result in a self-supported film.

In FIG. 3 an example method sequence is shown in which a liquid solution is provided to the cylinder 12. In a first assembly step (1) a centrifugal field G is applied to the starting solution to form a disordered molecular sheet 35. An accompanying NMR spectrum (shown above each stage characteristic of that stage) shows a broad distorted single peak. In step (2) a magnetic field B is applied to cause molecular alignment. An accompanying NMR spectrum shows a complex dipolar pattern indicative of a particular molecular alignment. Subsequently, in step (3) a voltage is applied by power source 19 (see FIG. 1) between a central conductor 33 (see FIG. 2) and a metal housing 13, resulting in a radial electric field, E. A voltage can also be applied between disk electrodes 11 located above and below cylinder 12 (see FIG. 1) to subject the molecules to a longitudinal electric field. The electric field E aligns the molecules by interaction with an electric dipole moment of the molecules. The NMR spectrum shows the further evolution of the alignment process. In step (4) the rotation speed of the cylinder 12 is increased substantially to cause the molecules to condense further; excess solvent, if present, can be removed by application of heat. The accompanying NMR pattern reveals a new structure indicating removal of the solvent and the characteristics of the condensed state of the molecular film 38. In step (5) the molecular film 38 has the molecules stitched together using a chemical cross-linking reaction initiated with UV/VIS/IR radiation (hv) to form a tailored molecular film 40, and the NMR spectrum reveals completion of the process by displaying characteristic broadened peaks. In step (6) the tailored molecular film 40 can then be removed from the surface 16 of the cylinder 12 as a final product film in the shape of a cylindrical film. The cylindrical film can be cut along its length and unrolled to form a flat film, if desired.

In other embodiments, any combination of intermolecular, intramolecular, mechanical, electrical and magnetic forces can be used to tailor the molecules into a desired end product macro-scale, micro-scale, or nano-scale article. The illustrated structure for the apparatus 10 can likewise take on a wide variety of appearances to accomplish the desired effect of manipulating molecular components of all types to assemble them into a nanostructured film product. In addition, any of a variety of conventional spectroscopic and inspection methods can be used to follow progress of the assembly process and to adjust parameters to achieve the desired results.

Possible applications of macroscopic membranes or films custom-designed at the molecular functional group level in materials and engineering are innumerable. Examples include enhanced and tailored membrane separations, time-release medical patches, chemical sensors, visual systems and data storage. A systematic investigation of various intermolecular and intramolecular forces and external fields acting on custom-designed and synthesized monomers is helpful to develop a generalized protocol for fabrication of different film types (e.g., membrane, patch, sensor, etc.). Chemical functionalization with very specific reactive groups for cross-linking will allow molecular subcomponents, such as monomers, to be "hooked" together in various orientations into a tapestry of macroscopic dimensions. In some embodiments a chemical catalyst can be added to achieve or enhance certain chemical reactions to achieve a desired end product film. Orientational control can be achieved by use of various molecule/molecule and molecule/field interactions and combinations thereof, such as intermolecular/intramolecular van de Waals attraction/repulsion and hydrogen bonding, coulomb attraction/repulsion, large anisotropic diamagnetic molecular susceptibility interacting with a magnetic field, and electric dipole moment interacting with an electric field. Translational movement and positioning of tailored monomers with a paramagnetic center can be achieved using a magnetic field gradient to "drag" molecules, according to the magnitudes of the magnetic field and magnetic field gradient. Segregation of molecules by molecular mass can be achieved in layers by application of large gravitational fields or varied centrifugal forces. The design protocol includes using internal and external fields to manipulate molecular position, orientation and conformation into patterns, as well as the characterization of the effects of these processes on the molecular systems and the nanostructure of the resulting film or membrane product. To unlock a host of technological possibilities, molecule nanoweaving can capitalize on two main capabilities: (1) A system of multi-scale theory and computational simulations that smoothly and efficiently transcends from molecular details to continuum dimensions, and guides experimental design and optimization, (2) NMR spectroscopy and imaging using unique toroid cavity detectors and other devices for in situ monitoring of various aspects of the nano-weaving processes. However, the scope of the invention contemplates use of other spectroscopies to characterize the patterning/assembly of molecules.

One particular example is to have monomer molecule A in one solvent, monomer molecule B in a second solvent immiscible with the first in a toroid cavity detector in an NMR spectrometer, use spinning to generate centrifugal field G so as to create a cylindrical shell interface between the two layers, where molecules A and B can be in proximity. The application of magnetic and electric fields of predefined direction and magnitude arranges the component monomers into a desired pattern. A chemical reaction can then be initiated with the application of heat or light (or other electromagnetic radiation) to affect chemical cross-links between molecules A and B. The result is a film that maintains a well-defined pattern of component molecules A and B upon removal of the applied fields. Chemical synthesis of monomer molecules will tailor functionalization so as to achieve desired design features in the patterned film. For example, one of the molecules A or B can have high diamagnetic susceptibility anisotropy for strong alignment in the magnetic field $B_0$. This is easily satisfied by a rod shape; the length of the mesogenic rod is the major variable. A generic scheme is to have a reactive cross-linking group attached via a flexible spacer section to a mesogen rod attached to another reactive cross-linking group via another spacer. A resulting designed pore size, shape, and functionality will be determined by the length and dangling functional groups in the spacer section. Other self-assembling functionalization will take advantage of hydrogen-bonding and van der Waals interactions, including pi stacking of aromatic side groups. Fine alignment via electric fields and field gradients can be achieved by controlling electric moments using polar functional groups. All these aspects can be tested through simulations, such as molecular dispersion. The pattern is constructed by tuning the proper combination of fields. NMR can be used to monitor in situ the approach to pattern formation and to verify that the pattern has been achieved and is stable. At precisely this stage the cross-linking groups can be activated by light, or other electromagnetic energy or the pattern can be fixed by temperature quenching. NMR continues to monitor the events, the formation of the new covalent bonds, and setting of the final film to the desired product. There are many possible choices for functional groups appended to monomers A and B that are to cross-link upon photo-activation. For custom design of properties of the final product, "decorative" functional groups include those that can be chosen to control pore electronic structure so as to have hydrophilic, or hydrophobic, or molecule-specific sieving properties, chromophores, acid groups, or other function-enhancing sites. Applications can also involve formation of multilayer films. The first layer can provide hooks at known separations and distributions upon which the second layer will form, and so on. Or the first layer may have holes in the pattern and field gradients may be used to drag or thread molecules through these holes. The ability to custom design multilayer films each with specific functionalities at the nano-scale presents a multitude of opportunities for technological applications in, for example, chemical, biological, mechanical, electrical and optical areas.

The use of the toroid cavity detector in NMR spectroscopy and imaging. The toroid cavity detector (TCD) permits unique types of NMR spectroscopy and imaging that are suited to cylindrical shell geometries. Measurement of distribution of solute molecules by a two-dimensional spectroscopy-imaging combination which relates NMR chemical shift information (chemical identity) with spin count (relative numbers of molecules or functional groups) as a function of radial position within the toroid cavity (cylindrical) chamber has been demonstrated. This has many possible applications. NMR measurement of molecular orientation and degree of alignment (the order parameter, S) in the chamber is an example. Transport measurements can be carried out using NMR techniques. For example, measurement of mobility (diffusion) and dynamics of molecules using the toroid cavity detector has already been demonstrated. One of the important applications of the TCD is in monitoring reactions under extreme conditions of temperature and pressure. NMR methods permit (a) monitoring of a polymerization reaction as a function of time (new functional groups forming as a consequence of cross-linking) and (b) chemical characterization of a film or polymer membrane (types of bonds, dangling functional groups, and their relative amounts) after reaction is completed. The presence of the central conductor provides a number of unique opportunities some of which are central to the present work. The TCD permits application of radial electric field (and grad E) to affect molecular orientation and alignment. Electrosynthesis of films on either a central conductor or the inside of a rotor, functioning as an electrode, is achievable.

Application of electric fields, magnetic fields, and their gradients simultaneously in various directions. As mentioned above, the toroid cavity has the unique feature that it permits application of radial and longitudinal electric fields (and grad E) to affect molecular orientation during the molecular assembly process. The orientation of the spinning axis of the toroid cavity relative to the magnetic field $B_0$ of the spectrometer is an independent variable (See FIG. 1). Still other independent variables are x, y, or z magnetic field gradients that can be applied in well-defined, precise combinations, taking advantage of conventional technologies already built into magnetic resonance spectrometers.

NMR spectroscopy permits characterization of chemical structure, dynamics, and position at all stages of the process, in situ or ex situ. NMR has been used with considerable success to solve three-dimensional atomic structures of very large systems such as proteins, and is one of the most powerful and informative probes of molecular dynamics in all states of matter. In preferred methods, H-NMR techniques can be used for monitoring hydrogen-bonded networks, chemical interactions and reactions of chemical agents with functionalized films. D-NMR is an ideally suited mature technique for monitoring orientation and dynamics, which can be applied during film synthesis/assembly and studies of restricted molecular dynamics post-assembly. Once the film is formed, Xe-NMR spectroscopy can be used to characterize the pore distribution, nature of cavities and channels of the film or polymer membrane product ex situ. Information is encoded in the large intermolecular Xe chemical shifts and the average Xe chemical shift tensor components obtained from Xe-NMR spectroscopy. These quantities are extremely sensitive to the electronic structure of the environment and the nature of the averaging over the Xe positions, so that the Xe-NMR spectra are excellent indicators of pore size, shape and symmetry. Xe imaging also provides direct visualization of the Xe distribution.

Application of the centrifugal field. This use of G forces takes advantage of a conventional technology that comes as a built-in feature in magnetic resonance spectrometers used for solid samples. In conventional NMR spectrometers we can routinely spin samples up to 30 kHz. The centrifugal field generated in the sample at these spinning speeds offers the following advantages: (a) it obviates the need of a solid support to form the quasi-two-dimensional layer. Orientational ordering of molecules on solid supports is complicated by many additional variables including the purity and reproducibility of the solid surface and the specific nature of the interactions between the molecules and the surface atoms; (b) it provides means to control the orientation of monomers at the interface, which in turn permits design via control of the polymer growth at the interface.

The use of two immiscible fluid solvents. Centrifugal fields create a cylindrical interface between the fluid solvents. This permits congregation of A monomers with B monomers only at the interface, where light-actuated polymerization reaction can be initiated, and the choice of solvents can influence the rate of the desired reaction.

In order to implement the invention the desired end product is prepared by completing a series of tasks with the likelihood of success dictated by various precursor tests to be performed. The preferred order of experimental tasks is delineated here, with theoretical simulations being required for prediction of the required magnetic and electric fields and their gradients in each of the steps, as well as suggestions for molecular properties of monomers A and B. First it is necessary to establish that we can manipulate the preferential orientation and alignment of either one (or both) of two types of molecules A and B in the experimental set-up, and at the same time characterize completely the distributions and dynamics of the molecules experimentally. The first tests involve considering our theoretically predicted ability to manipulate the molecules and/or molecular self-assemblies (molecular aggregates) using one field knob at a time: $B_0$, E, G, and then a combination of these. We use NMR to monitor the formation of the pattern and to tell us when the pattern has been achieved so as to have the desired distribution of inter-functional group distances for cross-linking, and whether the pattern is holding. We use electric fields for fine orientational control of A relative to B while capitalizing on the preferential self-assembly interactions for the strong alignment control of B. At the precise point when NMR tells us that the desired pattern is achieved we can carry out a photocatalyzed reaction at the interface to cross-link A with B, producing a nano-structured film or membrane. Finally, we characterize the film to verify the desired property, such as a film having a pore structure that we want to produce, that is, that we have a nano-structured product of macroscopic dimensions (in the case of the apparatus 10, the dimensions of the cylindrical surface 16) that can be taken out of the toroid cavity detector and used to make devices for any one of a variety of applications mentioned hereinbefore. Later on, we can consider also exercising such fine and strong controls over these molecules A and B at the interface between two immiscible liquids subjected to centrifugal fields.

Example chemical systems: We intend to take advantage of intrinsic preferential alignment of one of the monomers as a major factor in the assembly of the nanoweaving precursors. It is known that some chemical systems can be magnetically aligned. Examples are stearic acid-$d_{35}$,5-, 7-, 12-, 16-doxyl-stearic acids, $C_nH_{2n+2}$—$C_{36}D_{74}$, 20<n<34, and $C_{30}$ and $C_{36}$ normal paraffins. Paraffins are structurally anisotropic and are thus also diamagnetically anisotropic. When subjected to a magnetic field, the anisotropy of the susceptibility can act to orient materials. The diamagnetic susceptibility is low in paraffins, ca. $6.4 \times 10^{-7}$ in dimensionless units, and is insufficient to orient individual paraffin molecules. However, orientation can be dramatically enhanced by the cooperative alignment of molecules in lamellar crystalline materials. Recent studies indicate that this is the case for n-alkanes in which fields between 800 Gauss and 12 kGauss were applied to single-phase mixtures of $C_{16}$ and $C_{17}$ paraffins. The crystalline materials were found to exhibit an orientational distribution probability related to both magnetic field strength and crystal volume with the carbon-carbon bonds tending to orient perpendicular to the field. This microphase structure, which is considered to be intermediate between the extreme cases of complete miscibility and complete phase separation, is readily observed when one of the alkane components is isotopically labeled. Extensive studies have focused on various factors affecting this phase behavior, e.g., quench rate, quench temperature, molar composition, chain-length mismatch and confinement. We test the magnetic field knob using the equimolar mixtures of $C_{30}H(D)_{62}$:$C_{36}D(H)_{74}$ over a range of magnetic field strengths between 0 and 94 kGauss. These molecular rods, whose lengths are determined primarily by the number of carbons, will serve as our model monomer on which various functional groups can be hung for the desired properties of reactivity and alignment. A test of the centrifugal force field knob is to form the interface at the inner wall of the toroid cavity detector chamber after first manipulating the orientation of the molecules within the solvent using the $B_0$ field. Lowering the temperature or removing the solvent would cause the formation of an oriented film which can then be peeled off the inner surface 16.

Chemical synthesis can tailor functionalization so as to achieve design features. One of the molecules A or B will have high diamagnetic susceptibility anisotropy for strong alignment in the magnetic field $B_0$. This is easily satisfied by the rod shape; the length of the mesogenic rod is the major variable. A generic scheme is to have a reactive cross-linking group attached via a flexible spacer section to a mesogen rod attached to another reactive cross-linking group via another spacer. The pore size, shape, and functionality will be determined by the length and dangling functional groups in the spacer section. Other self-assembling functionalization will take advantage of hydrogen-bonding and van der Waals interactions, including pi stacking of aromatic side groups. Fine alignment via electric fields and field gradients can be achieved by controlling electric moments, using polar functional groups. All these aspects will be tested through molecular dynamic (MD) simulations. The pattern is constructed by tuning the proper combination of fields. In the preferred method, NMR is used at all steps to monitor in situ the approach to pattern formation, and to verify that the pattern has been achieved and is holding. At precisely this stage the cross-linking groups can be activated by light (or other radiation), or the pattern can be fixed by temperature quenching. NMR continues to monitor the events, the formation of the new covalent bonds, and setting of the final film to the desired product. There are many possible choices for functional groups at A and B that are to cross-link upon photo-activation. For custom design of properties of the final product, "decorative" functional groups include those that can be chosen to control pore electronic structure so as to have hydrophilic, or hydrophobic, or molecule-specific sieving properties, chromophores, or other function-enhancing sites.

Applications can also involve formation of multilayer films. The first layer can provide "hooks" at known separations and distributions upon which the second layer will form, and so on. Or the first layer may have holes in the pattern and field gradients may be used to drag or thread molecules through these holes. The ability to custom design multilayer films each with specific functionalities at the nano-scale would present a multitude of opportunities for technological applications as described hereinbefore.

It should be understood that various changes and modifications referred to in the embodiment described herein would be apparent to those skilled in the art. Such changes and modification can be made without departing from the spirit and scope of the present invention.

What is claimed is:

1. A method of constructing macroscopic films with tailored assemblies of molecules, comprising:
   providing starting molecules; and
   applying a force selected from the group of a gravitational force, a centrifugal force, a magnetic field force, and an electric field force to the starting molecules causing them to move in space and then chemically react to form tailored assemblies of molecules in a particular pattern in a nanoscale size macroscopic film for removal and subsequent use.

2. The method as defined in claim 1 further including the step of adding a chemical catalyst to catalyze chemical interactions between the molecules.

3. The method as defined in claim 1 wherein the step of providing starting molecules comprises selecting particular starting molecules which can be tailored to achieve a desired end property.

4. The method as defined in claim 3 wherein the desired end property is selected from the group consisting of specific chemical, electrical, magnetic, optical and mechanical properties.

5. The method as defined in claim 3 wherein the starting molecules have a selected molecular size, shape, steric appendages, and functional groups to achieve the desired end property.

6. The method as defined in claim 5 wherein the starting molecules are selected to achieve films with particular geometries on the nanometer scale.

7. The method as defined in claim 1 further including the step of forming the tailored assemblies of molecules into film products selected from the group consisting of nonporous polymer membranes, liquid crystal displays, optical gratings, magnetic films, electrochromic devices, electrochemical sensors, films of glass-like structure, non-porous films possessing surface activity for certain gases and proteins, and membranes with uniform single or multiple pore sizes.

8. A method of constructing macroscopic films with tailored assemblies of molecules, comprising:
   providing starting molecules having preselected properties;
   applying the starting molecules to a cylinder wall;
   spinning the cylinder to cause movement of the starting molecules so they are suspended in a fluid state;
   heating the cylinder to increase the mobility of the molecules;
   spinning the cylinder to cause movement of the starting molecules so they condense together;
   cooling the cylinder to decrease the mobility of the molecules; and
   stitching together the condensed molecules to form a macroscopic film with tailored assemblies of molecules.

9. The method as defined in claim 8 wherein the process of applying the starting molecules to a cylinder wall comprises at least two steps of rotating the cylinder at a first speed to cause suspension and initial movement together of the molecules, and then rotating the cylinder at a second speed greater than the first speed to cause the molecules to further condense the starting molecules and to remove any excess solvent which might be present.

10. The method as defined in claim 8 further including the steps of monitoring arrangement of the molecules by use of nuclear magnetic resonance (NMR) to obtain NMR spectra and images.

11. The method as defined in claim 10 further including the step of monitoring the NMR spectra to produce NMR data which is used to adjust the assembly of the molecules to achieve a desired macroscopic film.

12. The method as defined in claim 8 further including the step of applying at least one of a magnetic and an electric field to the starting molecules disposed on the cylinder wall and the formed thin film material.

13. The method as defined in claim 8 wherein the step of spinning the cylinder includes segregation of the starting molecules by molecular mass to achieve different layers of molecules.

14. An apparatus for constructing a macroscopic film with tailored assemblies of molecules, comprising:
   a rotatable cylinder having a cylinder wall disposed within a housing;
   a gas nozzle;
   a drive gas stream which is output from the gas nozzle;
   a stream of starting molecules applied to the cylinder;
   a spectroscopic device for monitoring structure of the molecules as they condense upon spinning of the cylinder; and
   a fiber optic for transmission of light to and from the cylinder wall.

15. The apparatus as defined in claim 14 further including at least one of a central conductor, an electric field electrode, a toroid cavity detector, a pivot component and an RF resonant circuit.

16. The apparatus as defined in claim 14 wherein the spectroscopic device comprises an NMR device.

17. The apparatus as defined in claim 15 further including a fiber optic cable disposed within the cylinder to observe assembly of the molecules and to expose the molecules to UV/VIS/IR radiation.

* * * * *